(12) United States Patent
Hennessey et al.

(10) Patent No.: US 7,549,359 B2
(45) Date of Patent: Jun. 23, 2009

(54) ALDYL A TEE SCRAPER

(75) Inventors: Frank Hennessey, Arlington Heights, IL (US); Dennis Jarnecke, River Forest, IL (US)

(73) Assignee: Gas Technology Institute, Des Plaines, IL (US)

( * ) Notice: Subject to any disclaimer, the term of this patent is extended or adjusted under 35 U.S.C. 154(b) by 56 days.

(21) Appl. No.: 11/811,534

(22) Filed: Jun. 11, 2007

(65) Prior Publication Data

US 2008/0302221 A1 Dec. 11, 2008

(51) Int. Cl.
*B23B 5/00* (2006.01)

(52) U.S. Cl. .............................. 82/113; 82/46; 82/70.2

(58) Field of Classification Search .............. 82/54, 82/70.1, 70.2, 113, 172; 30/94, 95, 96, 97, 30/101, 102; 408/105, 203.5; 269/287, 253, 269/225; 285/322; 405/156, 184.1; 137/15.08, 137/317, 320, 321, 323
See application file for complete search history.

(56) References Cited

U.S. PATENT DOCUMENTS

| | | | | |
|---|---|---|---|---|
| 1,029,584 A * | 6/1912 | Bughausen | ................. | 82/128 |
| 1,097,036 A * | 5/1914 | Lidster et al. | ................. | 408/105 |
| 1,312,187 A * | 8/1919 | Kongisberg | ................. | 30/96 |
| 1,737,181 A * | 11/1929 | Woodward | ................. | 137/15.08 |
| 2,865,098 A * | 12/1958 | Joseph et al. | ................. | 30/101 |
| 3,075,219 A | 1/1963 | Ott | | |
| 3,258,822 A * | 7/1966 | Schlesch et al. | ................. | 24/284 |
| 3,420,124 A * | 1/1969 | Trevathan | ................. | 408/54 |
| 3,636,803 A | 1/1972 | Miller | | |
| 3,762,829 A * | 10/1973 | Yilmaz | ................. | 408/105 |
| 3,817,649 A | 6/1974 | Medney | | |
| 3,819,163 A * | 6/1974 | Stunkard | ................. | 266/56 |
| 4,411,178 A * | 10/1983 | Wachs et al. | ................. | 82/113 |
| 4,691,600 A | 9/1987 | Carlson et al. | | |
| 4,736,934 A * | 4/1988 | Grech | ................. | 269/110 |
| 5,095,564 A * | 3/1992 | Kruger | ................. | 285/197 |
| 5,775,188 A * | 7/1998 | Strait | ................. | 82/1.11 |
| 5,810,522 A * | 9/1998 | Parker | ................. | 408/103 |
| 6,412,376 B1 | 7/2002 | Borgia, Jr. | | |
| 6,698,321 B2 | 3/2004 | Oswald | | |
| 6,901,967 B1 * | 6/2005 | Kuenzer | ................. | 138/99 |
| 2001/0032667 A1 * | 10/2001 | King et al. | ................. | 137/15.14 |

* cited by examiner

*Primary Examiner*—Jason Daniel Prone
*Assistant Examiner*—Jennifer Swinney
(74) *Attorney, Agent, or Firm*—Mark E. Fejer

(57) ABSTRACT

A utility service tee scraping tool having three basic components—a scraper or cutting element, a scraper holder, and an alignment body. The scraper includes a rigid, vertically oriented body to which one or more cutting blades are attached. The scraper holder includes a service pipe tee clamp having two gripping elements with surfaces adapted to fit snugly around the service pipe tee and maintain the tee scraping tool in a fixed position during operation. The tool may be manipulated from above ground. Although particularly suitable for use in keyhole excavations where remote operation of the tool is required, the tool may also be used in traditional excavations.

23 Claims, 7 Drawing Sheets

ALDYL A TEE SCRAPER

BACKGROUND OF THE INVENTION

1. Field of the Invention

This invention relates to an apparatus for use in the repairing of thermoplastic underground utility pipes and, in particular, service tees. This invention further relates to an apparatus for use in repairing thermoplastic underground utility service tees from above ground through keyhole and similar minimal excavations.

2. Description of Related Art

Aldyl "A", also referred to as Aldyl A polyethylene, is one of several thermoplastic materials which has been used for many years to produce pipes for gas utility distribution systems. Piping systems made of thermoplastic materials such as Aldyl A have enjoyed widespread popularity due primarily to the ease with which such systems may be fabricated and installed. Pipe made of thermoplastic materials are lightweight, corrosion resistant, strong and durable. However, many thermoplastic gas distribution systems which have been in service for several years are experiencing problems with leaking joints and service tees. The leaks occurring in service tees typically are due to the failure of the threaded insert that secures the tee cap to the tee. Failure of the threads causes the cap to loosen or even come off of the tee, allowing gas that seeps past the tee coupon to escape into the surrounding soil. One method for addressing this problem involves the installation of an electrofusion coupling with a new cap. However, this method requires reducing the outer diameter of the tee to the proper size for accepting the electrofusion coupling.

"Keyholing" and "potholing" refers to the excavation of a hole to access or repair utilities. Potholing and keyholing are preferred over other techniques such as digging shovels, backhoes, and the like which often result in damage to the utilities and the corresponding demand for expensive repair and reconstruction. In addition to the increased costs associated with damage repair and increased labor costs associated with digging, such damage may present danger to workers or others in the immediate vicinity of the excavation. Typically, a keyhole is 12-18 inches in diameter and up to about ten feet in depth and visibility down the keyhole is limited, thereby precluding the use of conventional tools to access the utility. Thus, apparatuses for in-ground repairing of utility distribution systems must be capable not only of installation from above ground, but also of operation from above ground.

SUMMARY OF THE INVENTION

Accordingly, it is one object of this invention to provide an apparatus for in-ground repairing of utility distribution systems.

It is one object of this invention to provide an apparatus for in-ground repairing of underground thermoplastic pipe.

It is another object of this invention to provide an apparatus for in-ground repairing of underground thermoplastic service tees.

It is yet another object of this invention to provide an apparatus for in-ground repairing of underground thermoplastic pipe, including thermoplastic service tees, which is capable of being used in a keyhole excavation of the thermoplastic pipe or service tee.

These and other objects of this invention are addressed by a tee scraping tool comprising three basic components—a scraper or cutting element, a scraper holder, and an alignment body. The scraper in accordance with one embodiment of this invention comprises a rigid, hollow cylindrical body to which one or more cutting blades are attached. In accordance with an alternative embodiment of this invention, the scraper comprises at least one rigid, vertically oriented, inverted L-shaped profile to which at least one cutting blade is attached. The scraper holder comprises a pipe tee clamp having two gripping elements with surfaces adapted to fit snugly around the pipe tee and maintain the tee scraping tool in a fixed position during operation. The tool further comprises means for manipulating the tool from above ground. Although particularly suitable for use in keyhole excavations where remote operation of the tool is required, it will be appreciated by those skilled in the art that the tool may also be used in traditional excavations.

The tee scraper tool of this invention uses manual and/or mechanical force to apply rotational and downward force to the scraper. The combination of these forces drives the cutting blade, or blades, around the circumference of the vertical leg of the pipe tee and down its length to make the cut required to reduce the outer diameter of the tee leg to the proper size to accommodate a repair fitting. Before the tool is used, the one or more blades are set to the proper diameter required for the installation of the electrofusion coupling. The rigidity of the tool provides the inward radial force to the blade(s) and maintains the cutting diameter.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 2:
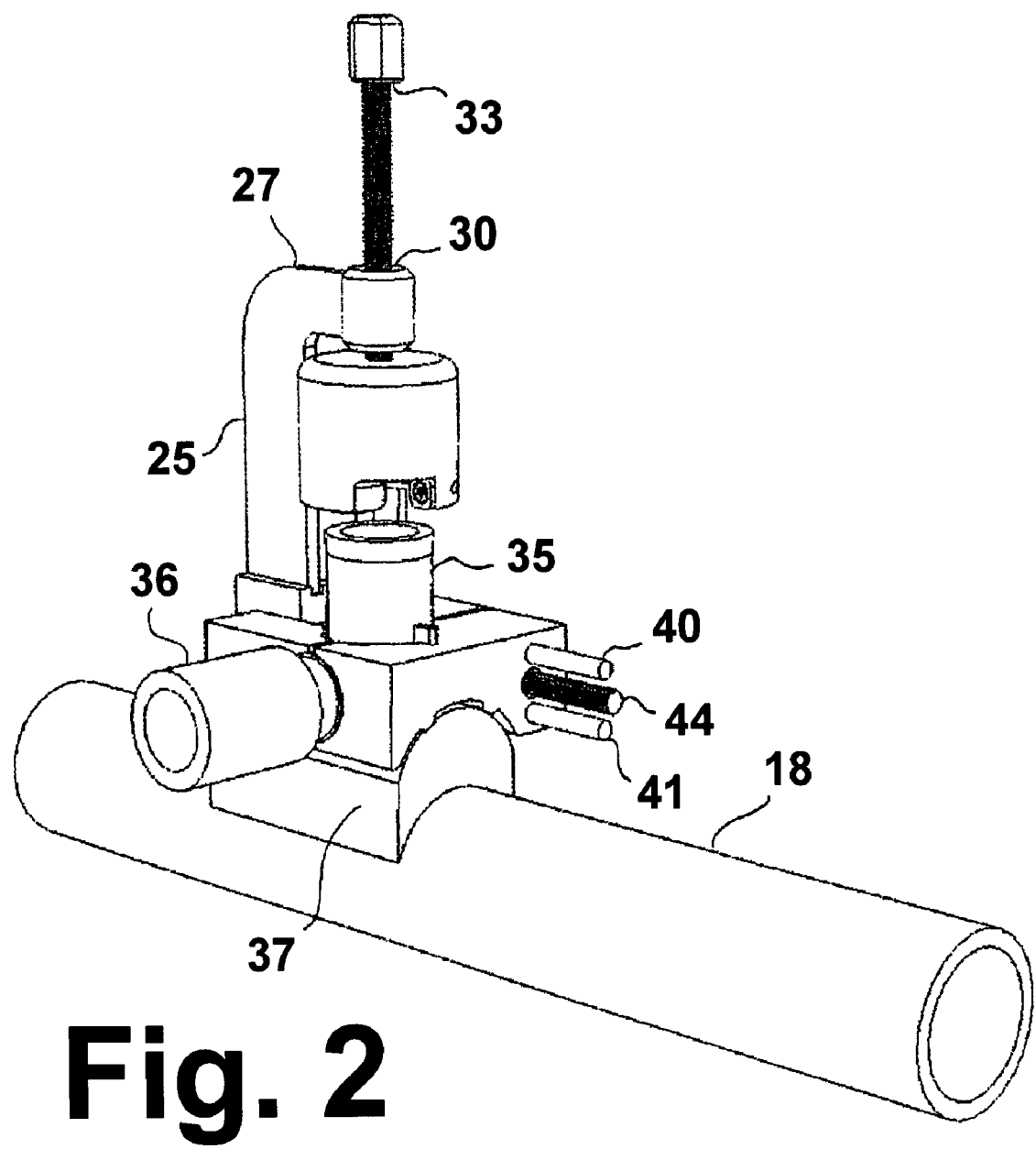
FIG. 2 is a perspective view of a tee scraper apparatus in accordance with one embodiment of this invention positioned around a pipe tee with the cutting element disposed in a raised position.
Figure 3:
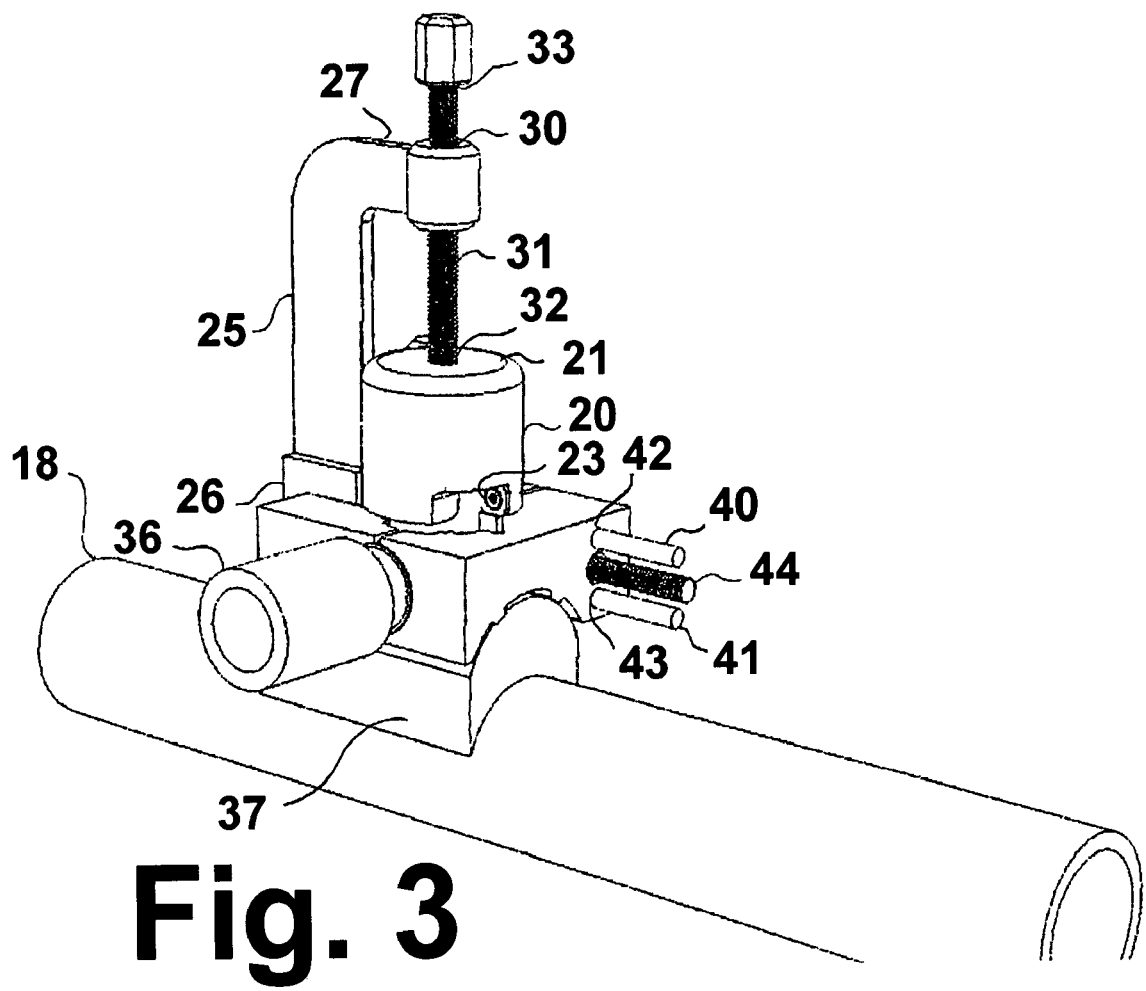
FIG. 3 is a perspective view of a tee scraper apparatus in accordance with one embodiment of this invention positioned around a pipe tee with the cutting element disposed in a lowered position.
Figure 5:
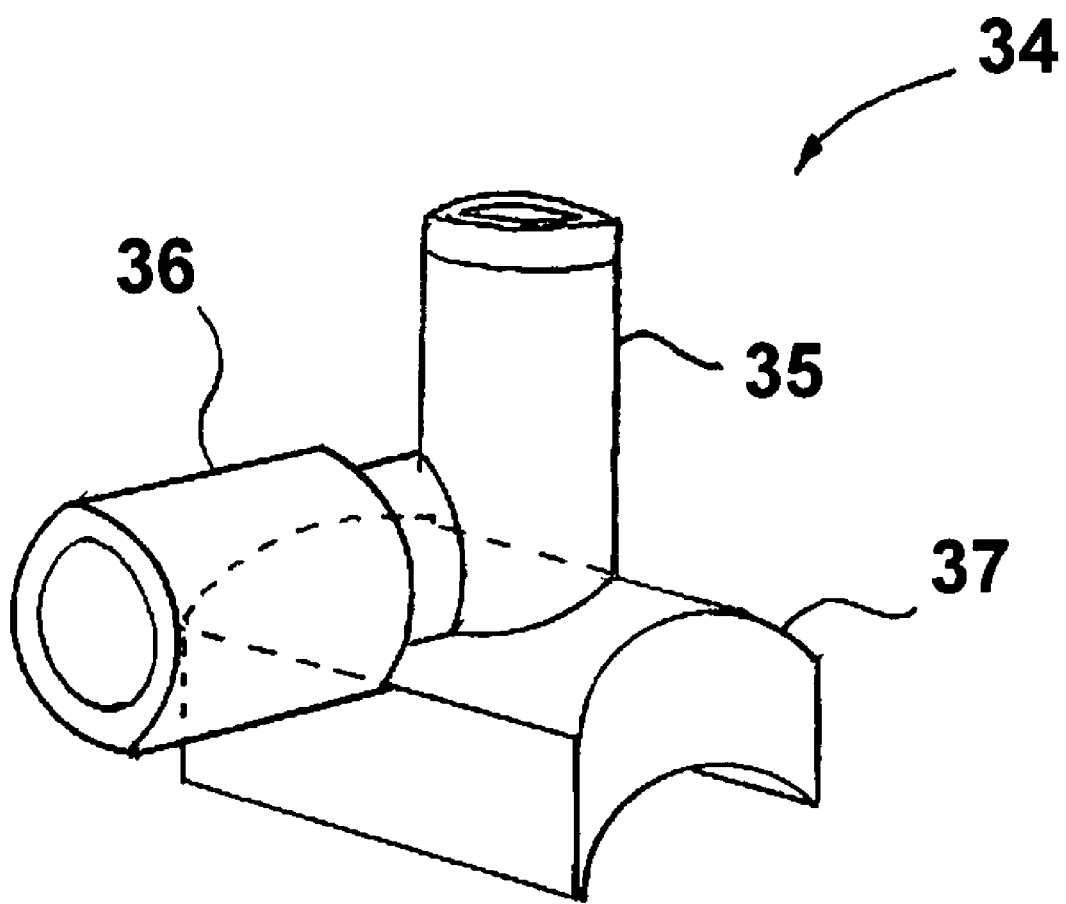
FIG. 5 is a perspective view of a pipe tee on which the tee scraper apparatus of this invention may be employed.

The primary object of the apparatus of this invention is to enable the in-ground repair of underground thermoplastic service tees employed by utilities to connect the utility customer to the main utility supply pipeline. Exemplary of a service tee to which the apparatus of this invention may be applied is service tee 34 shown in FIG. 5. As shown therein, the service tee 34 comprises a vertical tee leg 35, a horizontal tee leg 36 and a tee saddle 37, the latter of which acts as an interface between the tee legs and the pipeline 18 to which the tee is connected as shown in FIGS. 2 and 3.

Figure 1:
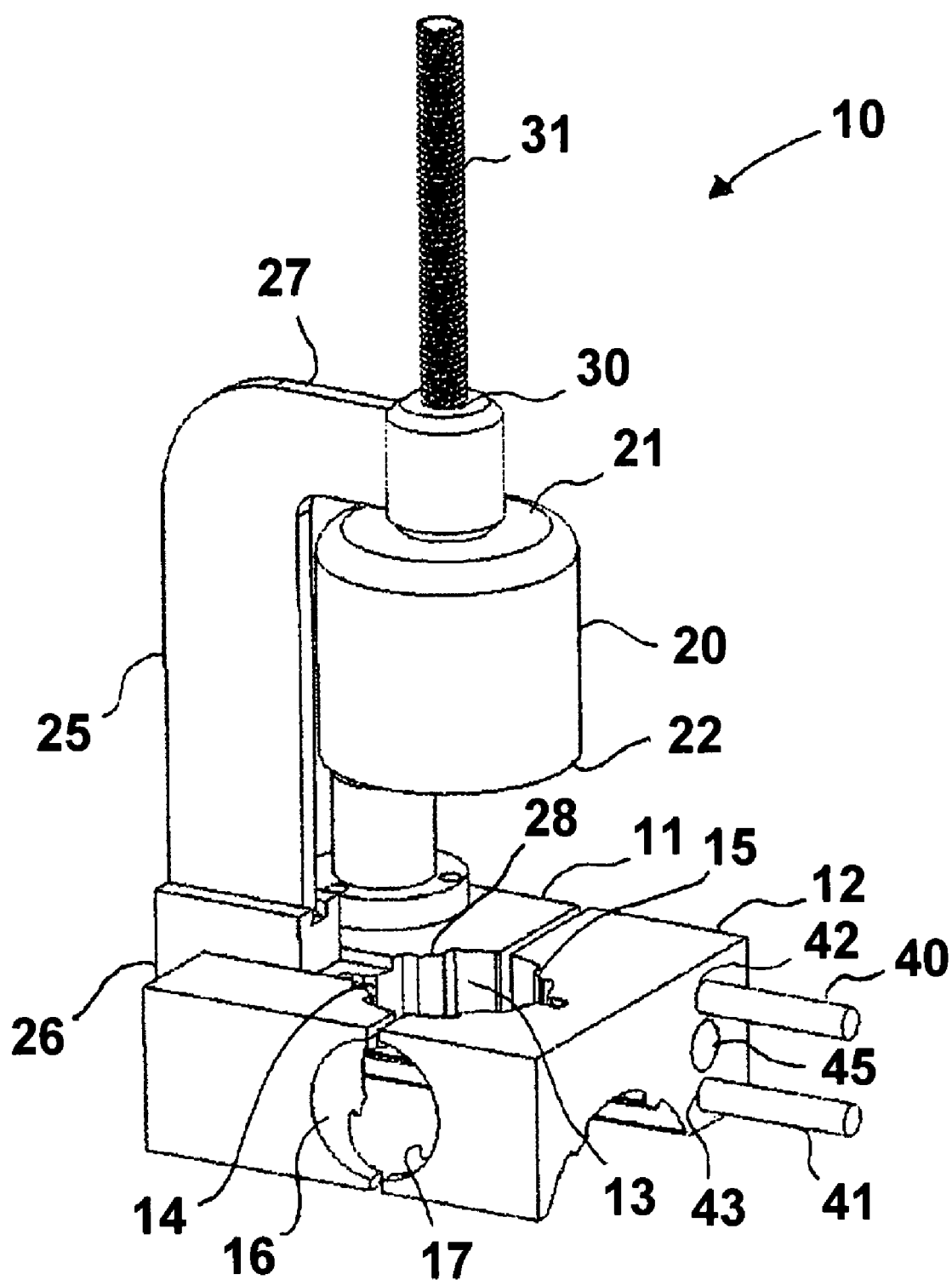
FIG. 1 is a perspective view of a tee scraper apparatus in accordance with one embodiment of this invention.

The aldyl "A" tee scraper 10 in accordance with one embodiment of this invention as shown in FIG. 1 comprises two opposed gripping elements 11 and 12, which act together to close about the service tee to stabilize the tee scraper around the tee and ensure proper alignment of the vertical tee leg with the cutting element during operation of the apparatus. Each gripping element forms one-half of a vertical throughbore 13 having a vertically oriented longitudinal axis, which is sized to snugly fit around the vertical tee leg when closed about the service tee. In accordance with one embodiment of this invention, each half throughbore 14, 15 of vertical throughbore 13 is provided with gripping protrusions 28. While not essential to the operation of the apparatus, the gripping protrusions provide for more secure gripping of the vertical tee leg in cases where the outer surface of the tee leg is not smooth due, for example, to the caking or adherence of soil to the outer surface. Gripping elements 11 and 12 form vertically oriented half throughbores 16, 17 which form a horizontal throughbore along one side of the apparatus sized to fit snugly around the horizontal tee leg of the service tee when the gripping elements are closed about the service tee. The bottom surfaces of the gripping elements form arcuate concavities 24 which enable the gripping elements to accommodate the tee saddle 37 during operation of the apparatus.

Figure 4:
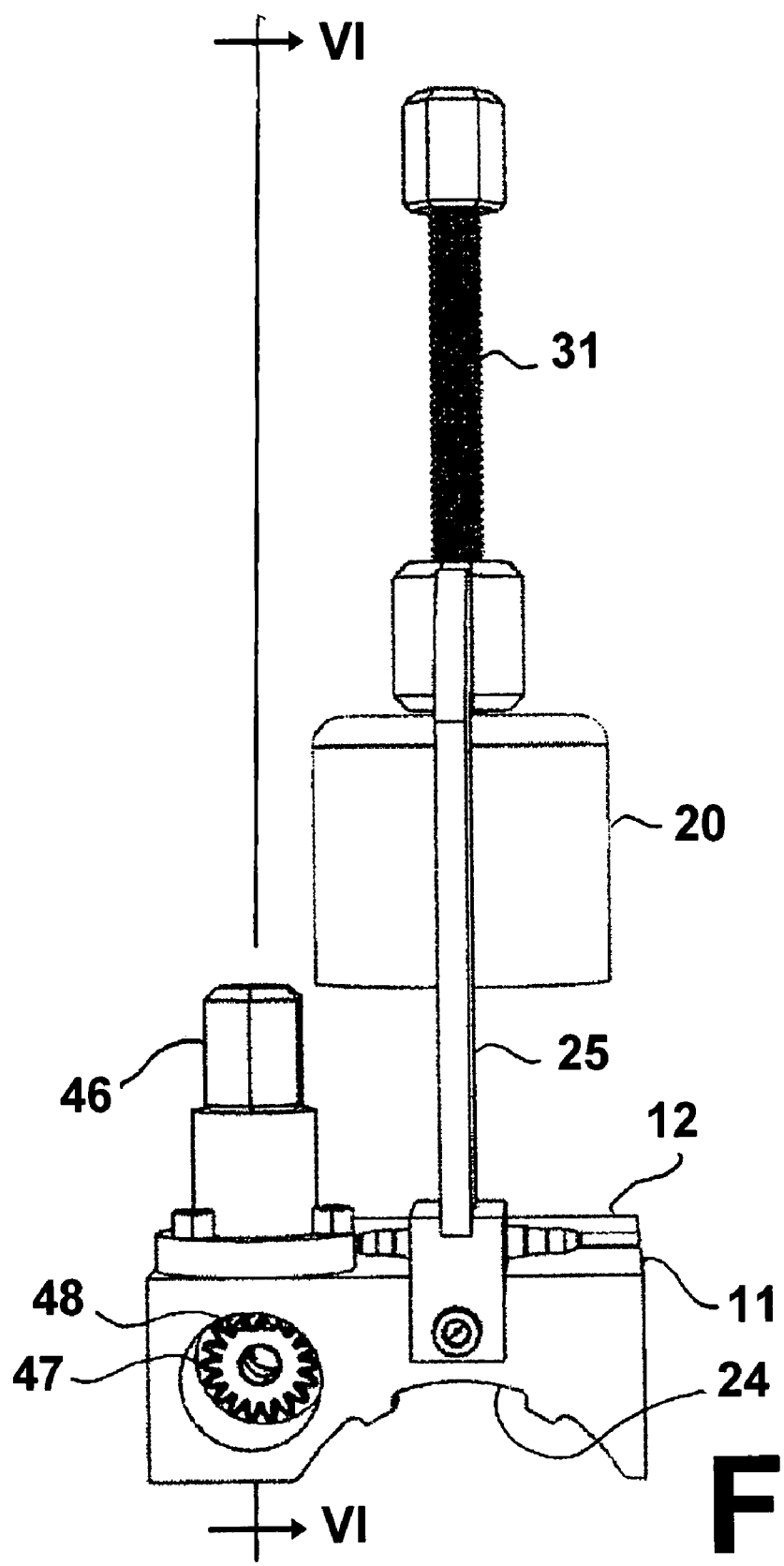
FIG. 4 is a back view of a tee scraper apparatus in accordance with one embodiment of this invention.
Figure 6:
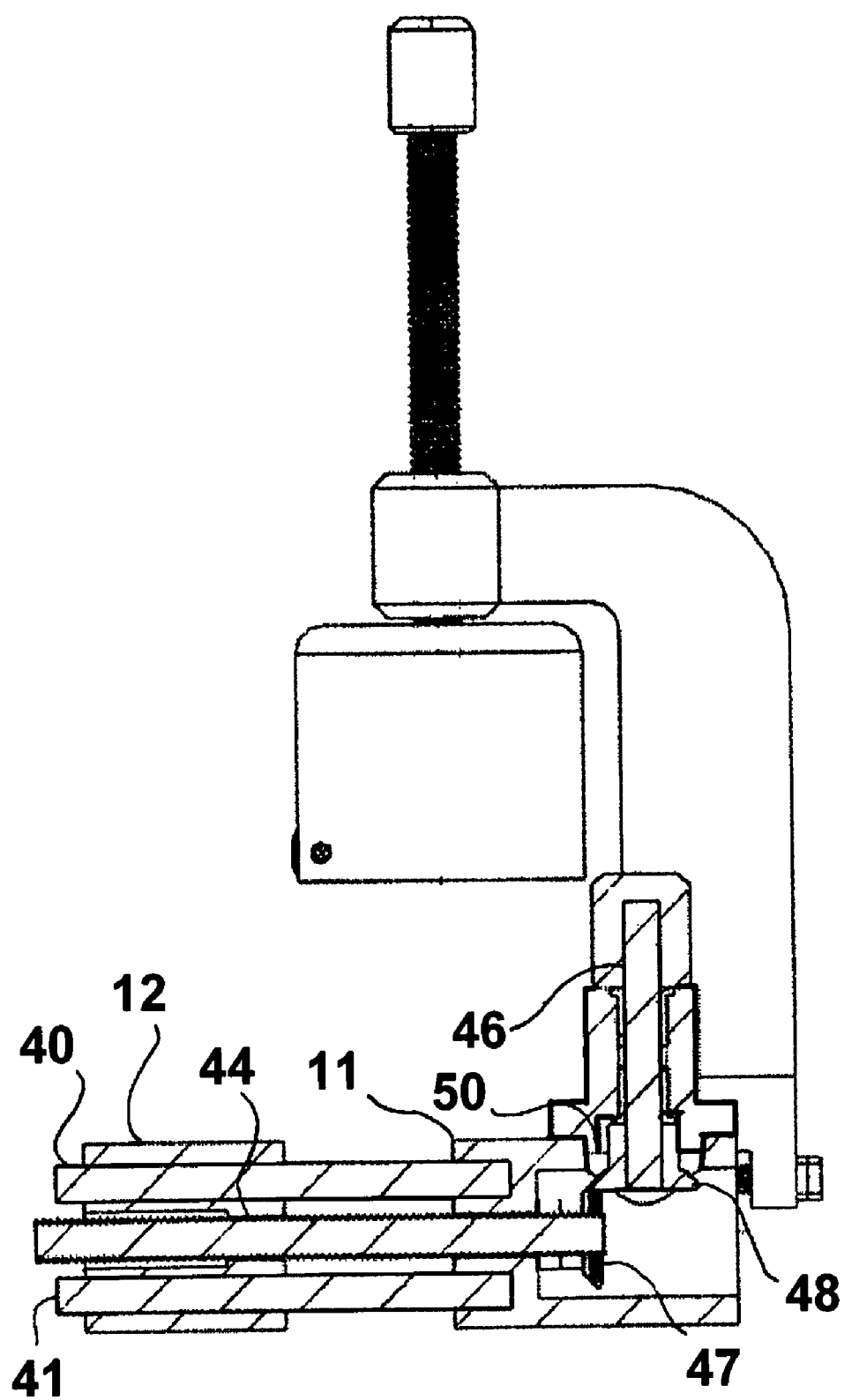
FIG. 6 is a partial cross-sectional view of the apparatus of this invention shown in FIG. 4 taken along the line VI-VI.

The gripping elements are connected with each other by a pair of horizontally oriented guide rods 40, 41, one end of which is fixedly connected with one of the gripping elements 11. The opposite ends of the guide rods are slidable within guide rod receiver bores 42, 43 formed by the opposed gripping element 12. Also connecting gripping element 11 with a gripping element 12 is a horizontal control rod 44, as shown, for example, in FIG. 2, having one end connected with gripping element 11 and having the opposite end horizontally movable within a control rod receiver bore 45 form by gripping element 12. In accordance with one embodiment of this invention as shown in FIGS. 2 and 3, the horizontally movable end of control rod 44 as well as control rod receiver bore 45 are threaded. In this way, rotation of control rod 44 increases or decreases the distance between the gripping elements. In accordance with one embodiment of this invention, the end of control rod 44 connected with gripping element 11 is attached with a vertically oriented helical gear 47 as shown in FIGS. 4 and 6, which vertically oriented helical gear engages a horizontally oriented helical gear 48 connected with one end of vertical control rod 46 extending vertically through a control rod vertical bore 50 formed by gripping element 11.

The tee scraper or cutting element in accordance with one embodiment of the apparatus of this invention comprises a substantially hollow cylindrical cutting element 20 having an upward oriented control end 21 and a downward oriented cutting end 22. Connected with the cutting end of cutting element 20 is at least one cutting knife or edge 23 as shown in FIG. 3. It will be appreciated that, although shown with but a single cutting knife or edge, cutting element 20 may be fitted with a plurality of cutting knives or edges, and such embodiments are deemed to be within the scope of this invention.

Figure 7:
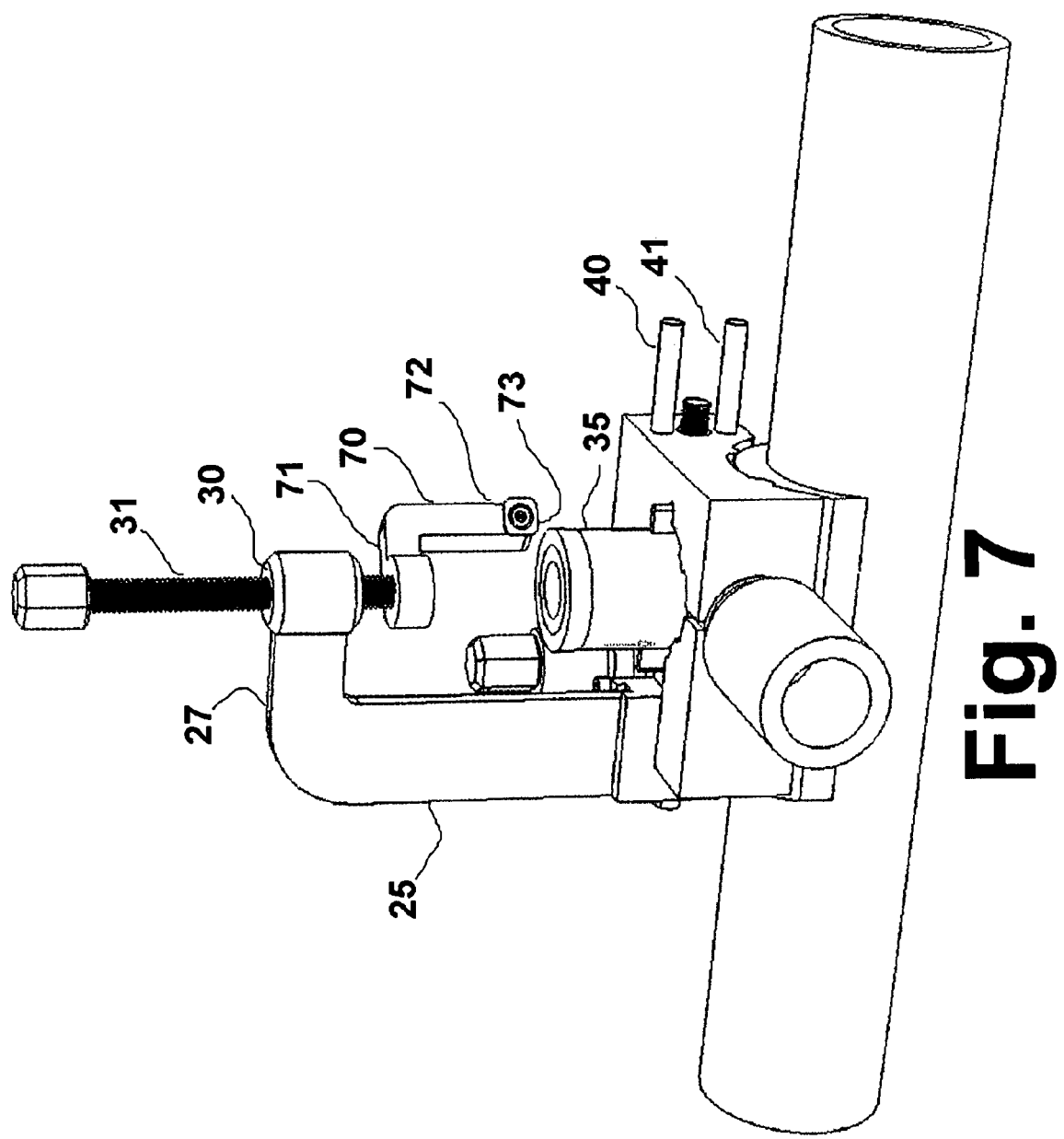
FIG. 7 is a perspective view of a tee scraper apparatus in accordance with one embodiment of this invention.

In accordance with one embodiment of this invention as shown in FIG. 7, the tee scraper or cutting element comprises a rigid, vertically oriented, inverted L-shaped profile 70 having a control end 71 and a cutting end 72. Connected with the cutting end 72 of profile 70 is at least one cutting knife or edge 73.

Hollow cylindrical cutting element 20 or profile 70 is connected with one of gripping elements 11 and 12 by connection means. Any connection means which provides proper alignment of the cutting knife or edge 23, 73 with the vertical tee leg 35 of the service tee 34 may be employed. In accordance with one embodiment of this invention, the connection means comprises a vertically oriented support member 25 having a first support end 26 fixedly connected with gripping element 11. A horizontal support member 27, which extends over vertical throughbore 13, in accordance with one embodiment of this invention, is fixedly connected with the opposite end of vertically oriented support member 25. Hollow cylindrical cutting element 20, having a vertically oriented longitudinal or rotational axis, is connected with horizontal support member 27 such that its longitudinal or rotational axis is coincident with the vertically oriented longitudinal axis of vertical throughbore 13. In this way, proper alignment of the cutting element with the vertical tee leg 35 of service tee 34 is assured. In accordance with one embodiment of this invention, profile 70, having a vertically oriented rotational axis about which the profile rotates during the scraping operation, is connected with horizontal support member 27 such that its rotational axis is coincident with the vertically oriented longitudinal axis of vertical throughbore 13 as shown in FIG. 7.

During positioning of the gripping elements about the service tee, hollow cylindrical cutting element 20 or profile 70 is disposed in a raised position as shown in FIGS. 2 and 7. To scrape the vertical tee leg 35 of the service tee 34 in accordance with its intended purpose, hollow cylindrical cutting element 20 is lowered onto vertical tee leg 35 as shown in FIG. 3. Although not specifically shown in the drawings, scraping of the vertical tee leg 35 using profile 70 is achieved in a manner comparable to the operation of the hollow cylindrical cutting element 20. In accordance with one embodiment of this invention, horizontal support member 27 forms a vertically oriented support member throughbore 30, which is threaded to receive threaded cutting element control rod 31. Hollow cylindrical cutting element 20 is fixedly connected with cutting element connecting end 32 of cutting element guide rod beneath horizontal support member 27. The opposite end of the cutting element guide rod, drive end 33, is fitted with a drive end fitting designed to engage with a tool for rotating the cutting element guide rod, such as a wrench or ratchet. Thus, rotating of the cutting element guide rod raises and lowers cutting element 20 as desired. Rotation of the cutting element guide rod also rotates the hollow cylindrical cutting element and, thus, the cutting edge or knife, around the vertical tee leg of the service tee. It will be appreciated that other means of raising and lowering the cutting element, such as by a vertically movable connection between vertically oriented support member 25 and horizontal support member 27, may be employed, and such other means are deemed to be within the scope of this invention.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus comprising:
a pipe tee clamp comprising opposed gripping elements, each said gripping element forming one-half of a vertical throughbore sized to fit snugly around a vertically oriented pipe tee leg when said pipe tee clamp is in a clamping position and each gripping element having a horizontally oriented concave surface sized to fit snugly around at least a portion of a horizontally oriented pipe tee leg when said pipe tee clamp is in said clamping position;
adjustable connecting means for connecting said gripping elements with each other and adjusting a distance between said gripping elements; and
a substantially vertically oriented cutting element having an upward oriented control end, a downward oriented cutting end, and a rotational axis corresponding to a vertical throughbore axis of said vertical throughbore, connected with one of said gripping elements, said cutting element axially movable along and rotatable around said rotational axis.

2. An apparatus in accordance with claim 1, wherein said cutting element comprises a substantially hollow cylinder.

3. An apparatus in accordance with claim 1, wherein said cutting element comprises a rigid, vertically oriented, inverted L-shaped profile.

4. An apparatus in accordance with claim 1 further comprising a vertically oriented support member having a first support end connected with one of said gripping elements and a horizontal support member connected with said vertically oriented support member distal from said first support end and extending over said vertical throughbore, said cutting element connected with said horizontal support member.

5. An apparatus in accordance with claim 4, wherein said horizontal support member forms a vertically oriented support member throughbore having a support member throughbore axis corresponding with said vertical throughbore axis of said vertical throughbore.

6. An apparatus in accordance with claim 5 further comprising a cutting element guide rod extending through said vertically oriented support member throughbore having a cutting element connecting end connected with said cutting element beneath said horizontal support member and having a drive end opposite said connecting end.

7. An apparatus in accordance with claim 6, wherein said vertically oriented support member throughbore and said cutting element guide rod are threaded.

8. An apparatus in accordance with claim 1, wherein said adjustable connection means comprises at least two parallel guide rods having one end fixedly connected with one of said gripping elements and having an opposite end slidably disposed within corresponding guide rod receiver bores formed by said other gripping element.

9. An apparatus in accordance with claim 8, wherein said adjustable connection means further comprises a control rod having one control end fixedly connected against longitudinal movement with one of said gripping elements and having an opposite control rod end movably disposed within a corresponding control rod opening formed by said other gripping element.

10. An apparatus in accordance with claim 9, wherein said control rod and said control rod opening are threaded.

11. An apparatus in accordance with claim 10 further comprising drive means for rotating said control rod, thereby enabling adjustment of said distance between said gripping elements.

12. An apparatus in accordance with claim 11, wherein said drive means comprises a vertically oriented helical gear connected with said fixedly connected end of said control rod.

13. An apparatus in accordance with claim 12, wherein said drive means further comprises a vertically extending rotatable control rod control shaft having a horizontally oriented helical gear engaging said vertically oriented helical gear whereby rotation of said vertically extending rotatable control rod control shaft rotates said control rod.

14. An apparatus in accordance with claim 13, wherein said vertically extending rotatable control rod control shaft is fitted with a connector adapted to connect with a drive tool.

15. An apparatus comprising:
  a base forming a vertical throughbore and a horizontal bore intersecting said vertical throughbore, said base comprising two separable base elements, each of said separable base elements forming one-half of said vertical throughbore and one half of said horizontal bore;
  adjustable connection means for connecting and adjusting a distance between said two separable base elements; and
  a vertically oriented cutting element having a downward facing cutting end and having a rotational axis corresponding to a vertical throughbore axis of said vertical throughbore connected with one of said separable base elements, said cutting element vertically axially movable and rotatable around said longitudinal axis.

16. An apparatus in accordance with claim 15 further comprising a vertically oriented support member connected with one of said separable base elements and a horizontal support member connected with said vertically oriented support member distal from said base and extending over said base, said cutting element connected with said horizontal support member.

17. An apparatus in accordance with claim 16, wherein said horizontal support member forms a vertically oriented support member throughbore having a throughbore longitudinal axis corresponding with said vertical throughbore axis of said vertical throughbore.

18. An apparatus in accordance with claim 17 further comprising a cutting element control rod extending through said vertically oriented support member throughbore having a cutting element connecting end connected with said cutting element beneath said horizontal support member and having an opposed drive end.

19. An apparatus in accordance with claim 18, wherein said vertically oriented support member throughbore and said cutting element control rod are threaded.

20. An apparatus in accordance with claim 15, wherein said adjustable connection means comprises at least two parallel guide rods having one end fixedly connected with one of said separable base elements and having an opposite end movably disposed within corresponding guide rod receiver openings formed by the other of said separable base elements.

21. An apparatus in accordance with claim 20, wherein said adjustable connection means further comprises a base element control rod having one end fixedly connected against longitudinal movement with one of said separable base elements and having an opposite end disposed within a base element control rod opening formed by the other of said separable base elements.

22. An apparatus in accordance with claim 21, wherein said base element control rod and said base element control rod opening are threaded.

23. An apparatus in accordance with claim 22 further comprising threading means for threading said base element control rod in and out of said base element control rod opening.

* * * * *